United States Patent [19]

Batey et al.

[11] 4,110,590
[45] Aug. 29, 1978

[54] INERT GAS WELDING

[75] Inventors: John Walter Batey, Chester-le-Street; Anthony Charles Potter, Whitley Bay, both of England

[73] Assignee: Reyrolle Parsons Limited, England

[21] Appl. No.: 660,921

[22] Filed: Feb. 24, 1976

Related U.S. Application Data

[62] Division of Ser. No. 487,208, Jul. 9, 1974, abandoned.

[51] Int. Cl.² .................................................. B23K 9/16
[52] U.S. Cl. ..................................... 219/75; 219/137.2
[58] Field of Search ............... 219/125 R, 130, 137 R, 219/61, 74, 75

[56] References Cited
U.S. PATENT DOCUMENTS

| 3,123,702 | 3/1964 | Keidel et al. | 219/130 |
| 3,328,556 | 6/1967 | Nelson et al. | 219/125 R |
| 3,746,833 | 7/1973 | Ujiie | 219/137 R |
| 3,826,888 | 7/1974 | Garfield et al. | 219/130 |
| 3,924,095 | 12/1975 | Lucas, Jr. | 219/125 R |
| 3,963,895 | 6/1976 | Hennion | 219/125 R |

*Primary Examiner*—J. V. Truhe
*Assistant Examiner*—Clifford C. Shaw
*Attorney, Agent, or Firm*—Holman & Stern

[57] ABSTRACT

Welding apparatus for inert gas shielded arc welding comprising a welding gun for holding and controlling a non-consumable electrode and including means for supplying inert gas to the welding arc region by way of a gas cup surrounding but spaced from such an electrode when positioned in the gun, the welding gun being further provided with an extended gas shielding wall arrangement protruding a substantial distance beyond the gas cup and capable, either by itself or in combination with a narrow gap weld preparation, of substantially enclosing an electrode in the gun, except for its tip, when the electrode is protruding for a similar distance beyond the gas cup.

12 Claims, 7 Drawing Figures

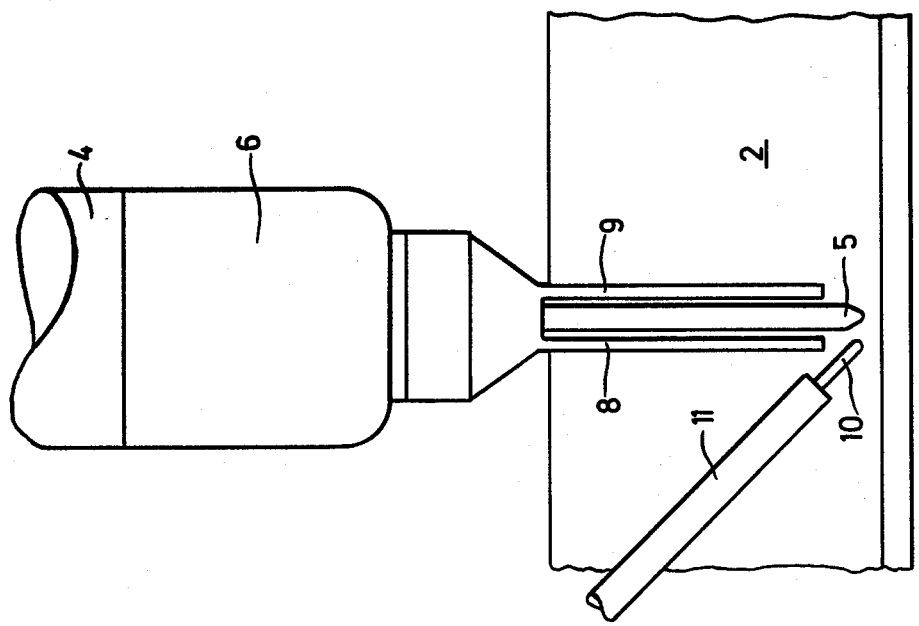
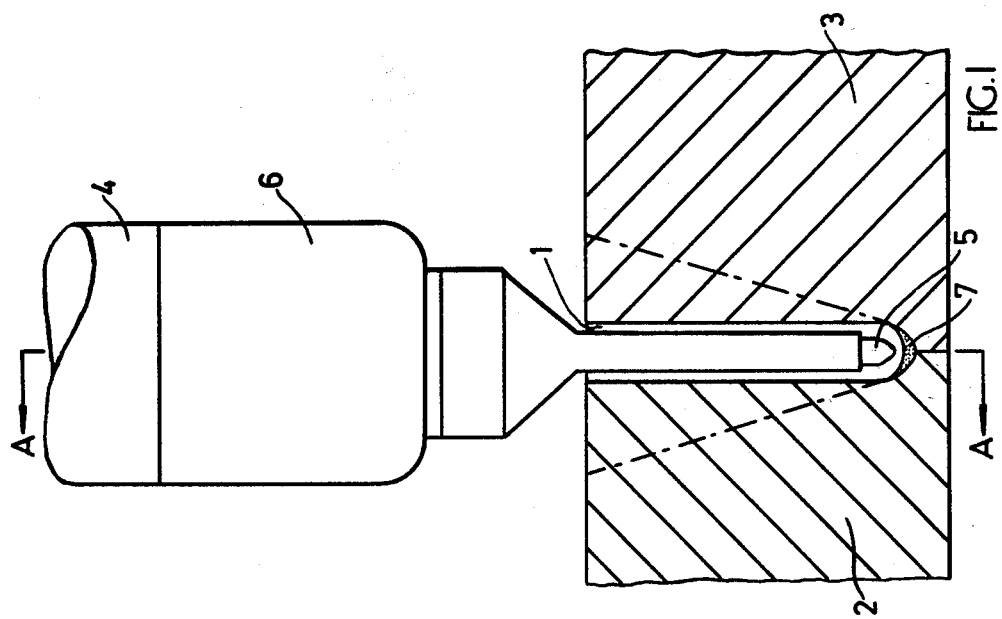

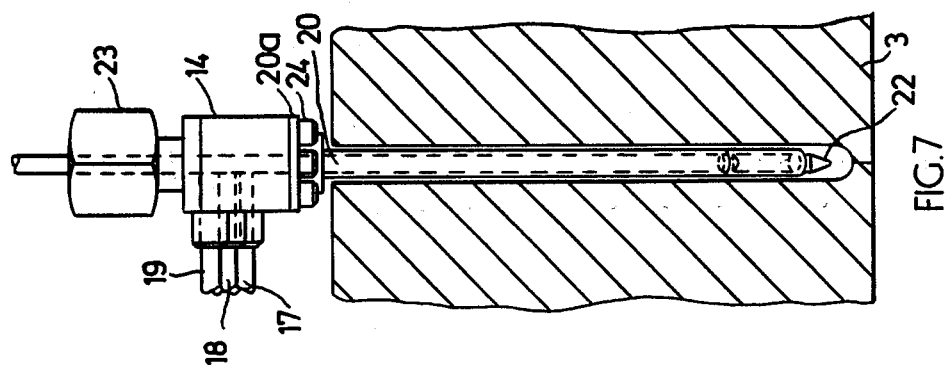
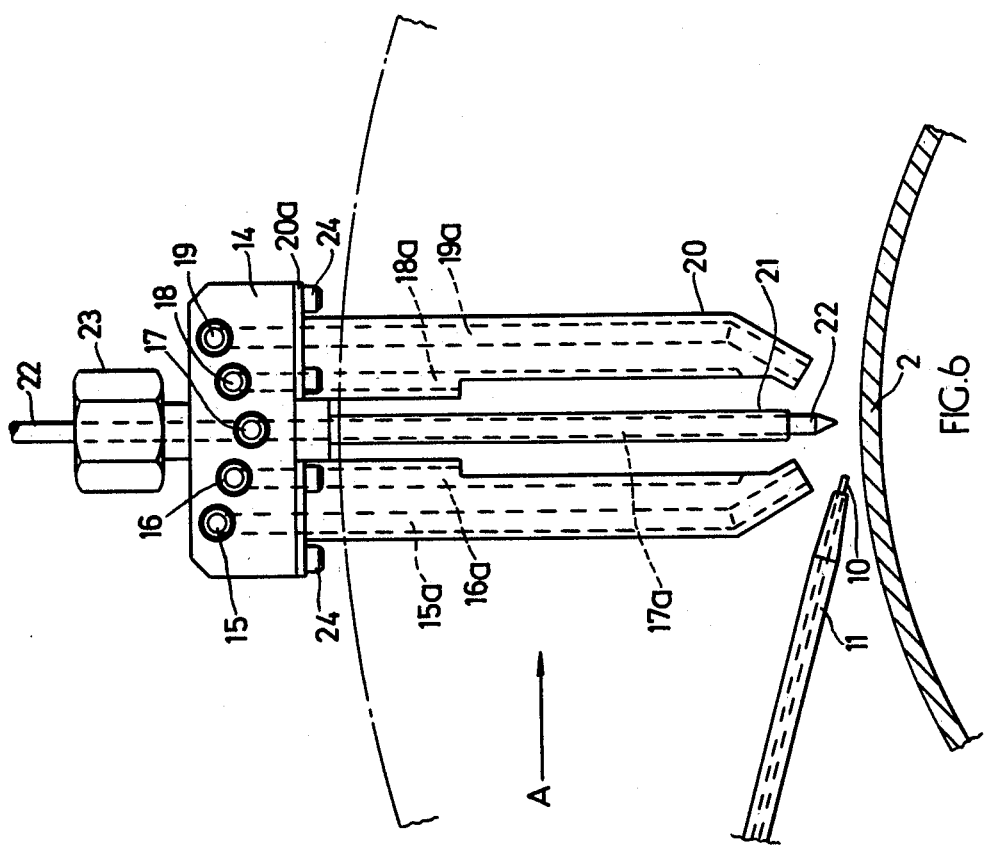

INERT GAS WELDING

This is a division of application Ser. No. 487,208 filed July 9, 1974, now abandoned.

BACKGROUND AND SUMMARY OF THE INVENTION

This invention relates to welding and is concerned more particularly, but not exclusively, with automatic welding of annular components.

Production of satisfactory welds, particularly as section thickness increases, presents substantial problems in the art of welding, a major one of which is the adequate provision of suitable access for welding to the weld deposit area. In general, the access problem when producing such welds has been overcome by using components so shaped that, when brought together for welding, a "U" or "V" shaped preparation or channel of substantial included angle and/or width is presented for the deposition of weld material. One process of welding which is applicable to such formations is submerged arc welding, where several adjacent runs of weld metal are required to complete each layer. However, when the wider parts of the "U" or "V" are reached, the resulting large volumes of weld metal can prove disadvantageous in terms of long welding times, excessive coats and gross distortion on cooling. A further acute problem is posed when a welding torch is required to operate in other than a "downhand", that is to say, gravity welding, position, such as occurs in the automatic welding of a non-rotating pipe joint.

The prime object of the present invention is to provide portable apparatus for the automatic welding of narrow-gap weld preparations made between annular components.

The invention consists in welding apparatus for inert gas shielded arc welding comprising a welding gun for holding and controlling a non-consumable electrode and including means for supplying inert gas to the welding arc region by way of a gas cup surrounding but spaced from such an electrode when positioned in the gun, the welding gun being further provided with an extended gas shielding wall arrangement protruding for a substantial distance beyond the gas cup and capable, either by itself or in combination with a narrow gap weld preparation, of substantially enclosing an electrode in the gun, except for its tip, when the electrode is protruding for a similar distance beyond the gas cup.

With apparatus according to the invention, welding of annular components can be carried out with the apparatus stationary and the components rotating, or alternatively, with the components stationary in any convenient orientation and with the welding apparatus automatically orbitting the components.

In the preferred form of the invention the shielding wall arrangement comprises two elongate shields diametrically opposed on opposite sides of the general electrode axis position, while leaving intermediate opposed areas between longitudinal edges of the shields beyond the gas cup unenclosed, the arrangement being such as to provide effective gas shielding about an electrode in the welding torch when the electrode protrudes substantially beyond the gas cup. The apparatus may thus be applied to narrow gap weld preparations with the shielding arrangement so positioned that the two shielding walls in combination with the opposing walls of the preparation result in the electrode being substantially surrounded over its length from the gas cup to the tip region and giving effective inert gas shielding for welding.

Preferably the groove width W of the weld preparation has the relationship to the electrode diameter D of $W = 1\frac{1}{2}D$ to $4D$.

The shielding walls are preferably formed from stainless steel.

The invention further consists in a method of producing welds using welding apparatus in accordance with any of the preceding three paragraphs, and comprising the following steps:

(i) shaping the end walls of the members to be welded prior to welding to provide a narrow gap weld preparation of width less than that of the welding gun gas cup;

(ii) arranging the electrode so as to protrude beyond the end of the shielding wall arrangement remote from the gas cup;

(iii) inserting the extended shielding wall arrangement and electrode of the welding gun into the narrow gap weld preparation, to allow the electrode tip to be brought into close proximity to the root of the narrow gap weld preparation, while the gas cap of the gun is outside the narrow gap weld preparation;

(iv) further inserting a weld filler wire into the narrow gap weld preparation so that its end may be fed into the arc gap region between the non-consumable electrode tip and the surface of the weld; and (v) proceeding to effect the weld by supplying electric current between the electrode and the root of the narrow gap weld preparation, and effecting relative movement between the electrode tip and the narrow gap weld preparation to deposit weld metal from the filler wire into the narrow gap weld preparation in the conventional way, but by means of only a single pass for each weld layer, at all depths of the weld.

The invention also consists in a method in accordance with the preceding paragraph in which the welding technique employed makes use of a pulsed current supply to the welding arc to ensure complete control of the weld pool of fusion at all times and in all welding positions.

BRIEF DESCRIPTION OF THE DRAWINGS

The invention will now be further described with reference to the accompanying drawings, in which:

FIG. 1 shows a cross-section through a narrow gap weld preparation together with a form of the welding apparatus in accordance with the present invention in position for effecting a weld in accordance with a method also according to the present invention;

FIG. 2 shows a section through the narrow weld preparation and apparatus shown in FIG. 1 taken on a line indicated by the arrows 'A';

FIGS. 6 and 7 show a further alternative form of welding apparatus according to the present invention.

DESCRIPTION OF THE PREFERRED EMBODIMENTS

Figure 5:
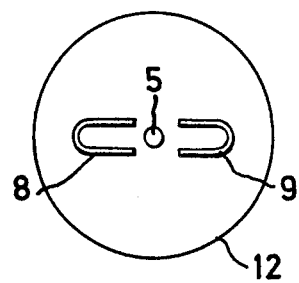
FIG. 5 is a fragmentary plan view of the apparatus of FIG. 3.

Referring to the drawings, FIGS. 1 and 2 show a narrow gap weld preparation which comprises a weld groove 1 between two members 2 and 3 to be welded together. The groove width as determined by practical considerations of weld metal control in all welding positions is between 1½D to 4(where D is electrode diameter and typically ⅛ inch (or 3 mm's) diameter).

The welding torch 4 for producing the weld is provided with a non-consumable electrode 5 extending from a gas cup to which argon for shielding the weld region is supplied.

The electrode 5 extends beyond the gas cup 6 for a distance exceeding the limits recommended for tungsten inert gas welding and in order to provide adequate shielding of the weld pool 7, an extended gas shielding wall arrangement is provided comprising two gas shields 8 & 9 fitted to the gas cup 6. As is clear from the Figures, the shields 8 and 9 in combination with the closely opposed side walls of the narrow gap weld preparation produce a substantially enclosed gas shield about the portion of electrode 5 extending beyond the gas cup 6 to the tip region, thus ensuring adequate provision of shielding gas to the weld pool.

With the arrangement shown it is possible to produce a satisfactory weld between members 2 and 3 by causing relative movement between the electrode 5 and the root of the weld preparation, while providing metal for the weld from a continuous filler wire 10 passing to the weld pool by way of a guide tube 11 designed to enter the preparation without fouling the sides. By using a pulses arc welding technique it is possible to employ pulse frequencies and currents such as to ensure complete control of the weld pool and fusion at all times and in all welding positions.

The apparatus disclosed herein enables satisfactory welding to be carried out on joints by means of only single-pass weld runs deposited directly on top of each other, using a welding torch, since only a narrow weld preparation is needed as opposed to previous techniques where a wide "V" preparation (for example as indicted by chain-dotted lines in FIG. 1) is required. The apparatus and method of the invention are thus highly suitable for automatic welding operations and particularly applicable to automatic welding of annular components, where either the torch may revolve or the annular component rotate.

Figure 3:
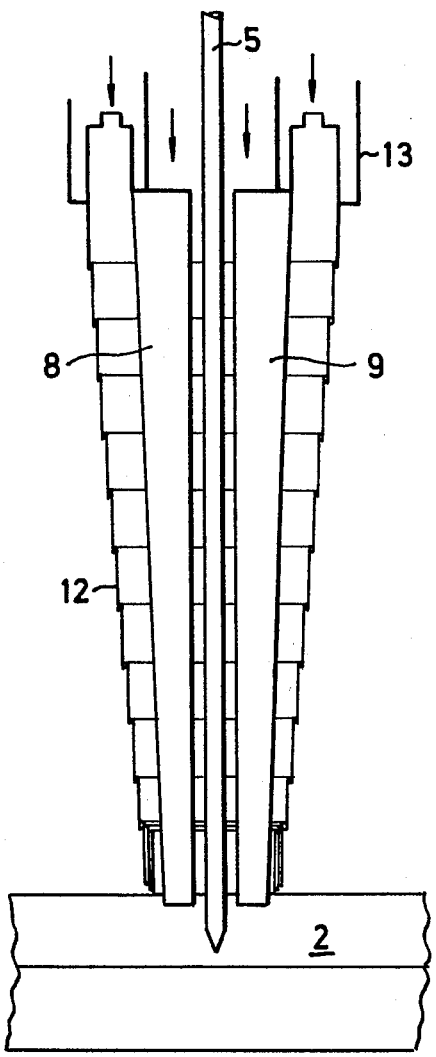
FIG. 3 shows diagrammatically an alternative form of welding apparatus according to the present invention.
Figure 4:
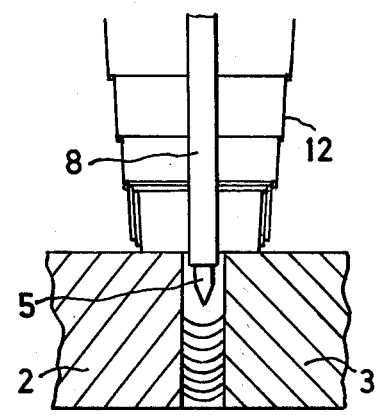
FIG. 4 is a fragmentary view taken at right angles to that of FIG. 3.

FIGS. 3 to 5 show an alternative form of welding apparatus in which the upper end of a telescopic gas shroud 12 is fixed to the gas cup 6 by means of a support flange 13 and the lower end of the shroud rests upon the member 2 and 3 to be welded together.

The shroud 12 surrounds the electrode 5 and shields 8 and 9 and is in the form of a series of annular rings of decreasing diameter, the upper end of each ring being flanged outwardly and the lower end being flanged inwardly so that adjacent flanges engage one another and each ring is supported by the ring next above. During the initial weld pass, i.e., with the welding torch at its lowest position, the shroud will be partly collapsed, but will be progressively extended as each weld pass is made and the welding torch raised.

The shroud is supplied with inert gas and assists in entraining the gas in the weld gap region.

FIG. 5 shows gas shields 8 and 9 which are U-shaped in cross-section with their pairs of arms directed towards each other.

In an alternative arrangement, now shown, the shroud may take the form of a flat strip coiled in such a way as to form a telescopic tube of tapering diameter.

FIGS. 6 and 7 show a still further alternative form of welding apparatus in which the torch is provided with a manifold 14 having gas inlet connections 15, 16, 18 and 19 which communicate with passages 15a, 16a, 18a and 19a in the walls of a gas shield 20. The electrode 22 is surrounded by a central electrode sheath 21 and the manifold 14 has a further gas inlet connection 17 which communicates with the space between electrode 22 and sheath 21. The electrode sheath 21 and electrode 22 are secured to the manifold 14 in a gas-tight manner by means of securing nut 23 and the gas shield 20 is secured by a flanged portion 20a to the base of the manifold 14 by screws 24.

With this arrangement a greater degree of control may be achieved over the gas distribution. As the weld build-up progresses those gas streams no longer required may be shut off, i.e., inlets 15 and 19 may be shut off first, then 16 and 18.

We claim:

1. Welding apparatus for inert gas shielded arc welding comprising:
   a non-consumable electrode having a longitudinal axis, a welding gun for holding and controlling said non-consumable electrode and including means for supplying inert gas to the welding arc region by way of a gas cup surrounding but spaced from such an electrode when positioned in the gun, the welding gun being further provided with an extended gas shielding wall arrangement having at least two end portions, each of said end portions having a longitudinal axis parallel with said electrode longitudinal axis, protruding a distance beyond the gas cup and capable, either by themselves or in combination with a narrow gap weld preparation, of substantially enclosing an electrode in the gun, except for its tip, when the electrode is protruding for a similar distance beyond the gas cup, said tip protruding through a plane which includes said end portions of said shielding wall.

2. Apparatus as claimed in claim 1, wherein the shielding wall arrangement comprises two elongate shields diametrically opposed on opposite sides of the general electrode axis position, the arrangement being such that in use that the two shields in combination with the opposing walls of a weld preparation result in the electrode being substantially surrounded over its length from the gas cup to the tip region and giving effective inert gas shielding for welding.

3. Apparatus as claimed in claim 1, wherein the shielding wall arrangement is composed of stainless steel.

4. Apparatus as claimed in claim 1, wherein the shielding wall arrangement consists of two elongate members of U-shaped cross-section, the open ends of which are directed towards each other.

5. Apparatus as claimed in claim 1, wherein the electrode and shielding wall arrangement are surrounded by a telescopic shroud of which one end is secured to the welding gun and the other engages the components to be welded together.

6. Apparatus as claimed in claim 5, wherein the shroud consists of a series of inter-engaging sections.

7. Welding apparatus for inert gas shielded arc welding of opposing walls of a narrow-gap weld preparation comprising:

a non-consumable electrode;

a welding gun assembly for holding and controlling said non-consumable electrode and including means for supplying inert gas to the welding arc region by way of a gas cup surrounding but spaced from an upper region of said electrode, the electrode protruding beyond the gas cup and extended gas shielding being provided by two elongate shields fixed diametrically on opposed sides of the gas cup such that in use the two shields in combination with the opposing walls of the weld preparation surround the length of the exposed electrode except for a tip region of said electrode so as to entrain and direct the flow of inert gas to the immediate vicinity of the weld region, said tip extending past a plane including end portions of said elongate shields.

8. Apparatus as claimed in claim 7 in which the shields are of generally "U" shaped cross-section each shield having an open end, the open ends spaced apart but facing one another so as to define in combination with the weld preparation and the gas cup a volume substantially confining the inert gas to the weld region.

9. Apparatus as claimed in claim 7 in which the shields are formed of stainless steel.

10. Apparatus as claimed in claim 7 wherein the minimum diameter D of said electrode and the weld preparation gap W has the relationship $W = 1.5D$ to $4D$.

11. Apparatus as claimed in claim 7 wherein there is provided a telescopic shroud suspended at one end from the gas cup so as in use to substantially surround the protruding electrode and gas shields when exposed above the surface of the weld preparation.

12. Apparatus as claimed in claim 11 wherein the shroud consists of a series of inter-engaging sections.

* * * * *